(12) United States Patent
Xu (10) Patent No.: US 11,465,324 B2
(45) Date of Patent: Oct. 11, 2022

(54) BUILDING DRAINAGE STACK, FORMING MOULD THEREOF AND FORMING METHOD THEREOF

(71) Applicant: YUZHOU JIETONG PLASTIC CO., LTD., Xuchang (CN)

(72) Inventor: Xin Xu, Xuchang (CN)

(73) Assignee: YUZHOU JIETONG PLASTIC CO., LTD., Xuchang (CN)

( * ) Notice: Subject to any disclaimer, the term of this patent is extended or adjusted under 35 U.S.C. 154(b) by 52 days.

(21) Appl. No.: 17/093,614

(22) Filed: Nov. 9, 2020

(65) Prior Publication Data

US 2022/0003349 A1 Jan. 6, 2022

(30) Foreign Application Priority Data

Jul. 1, 2020 (CN) .......................... 202010620864.9

(51) Int. Cl.
*B29C 48/00* (2019.01)
*B29C 48/09* (2019.01)
(Continued)

(52) U.S. Cl.
CPC ...... *B29C 48/0016* (2019.02); *B29C 48/0022* (2019.02); *B29C 48/09* (2019.02);
(Continued)

(58) Field of Classification Search
CPC . B29C 48/0016; B29C 48/0022; B29C 48/09; B29C 48/12; B29C 48/32;
(Continued)

(56) References Cited

U.S. PATENT DOCUMENTS 2,171,460 A * 8/1939 Thrasher ................... F04D 3/02
 415/72
2,909,985 A * 10/1959 Abrams .................... A23L 3/22
 99/348

(Continued)

FOREIGN PATENT DOCUMENTS

CN 104674909 A 6/2015
CN 204403593 U 6/2015
(Continued)

OTHER PUBLICATIONS

Office Action dated May 18, 2021 from the corresponding Chinese patent application No. 202010620864.9.

*Primary Examiner* — Manley L Cummins, IV
(74) *Attorney, Agent, or Firm* — Platinum Intellectual Property LLP (57) ABSTRACT

The invention discloses a building drainage riser, its forming mold and forming method. The riser comprises a riser body and at least one spiral blade. The spiral blade is in a spiral direction on the inner wall of the riser body, and the spiral blade is fixedly connected to the inner wall of the riser body through its bottom side; the inner side of the radial section of the spiral blade presents the first normal distribution curve and the first normal distribution The abscissa axis of the curve is located on a chord of the inner wall of the riser body, and the distance from the chord to the center of the riser body is greater than half of the inner diameter of the riser body and less than the inner diameter of the riser body. The inner wall of the building drainage riser is provided with a spiral inner reinforcement with a radial section inside the first normal distribution curve, which completely eliminates the sharp tip and the sharp joint between the top and the inner wall of the building drainage riser, reduces the pressure fluctuation in the pipe during drainage and reduces the (Continued)

falling water flow speed. In addition, the molding die and forming method have the advantages of simple structure and low cost.

5 Claims, 4 Drawing Sheets

(51) Int. Cl.
*B29C 48/32* (2019.01)
*B29C 48/12* (2019.01)
*E04D 13/08* (2006.01)
*F16L 55/027* (2006.01)
*B29L 23/00* (2006.01)

(52) U.S. Cl.
CPC .............. *B29C 48/12* (2019.02); *B29C 48/32* (2019.02); *E04D 13/08* (2013.01); *F16L 55/02772* (2013.01); *B29L 2023/22* (2013.01)

(58) Field of Classification Search
CPC ... B29C 48/13; B29C 48/33; B29L 2023/003; E03C 1/122; E03C 2001/1206; E03C 2201/60; E03D 1/00; F16L 55/02772; F16L 55/045

USPC .......................................... 264/465, 466, 467
See application file for complete search history.

(56) References Cited

U.S. PATENT DOCUMENTS

| | | | | |
|---|---|---|---|---|
| 3,320,340 A | * | 5/1967 | Luca ........................ | B29D 5/10 |
| | | | | 264/209.5 |
| 3,538,210 A | * | 11/1970 | Gatto ...................... | B29C 48/09 |
| | | | | 425/315 |
| 3,587,281 A | * | 6/1971 | Lemelson ............. | B21C 23/085 |
| | | | | 425/465 |
| 3,708,253 A | * | 1/1973 | Lemelson ............... | B29C 48/32 |
| | | | | 425/325 |
| 4,646,618 A | * | 3/1987 | Kurth .................. | B29C 67/0014 |
| | | | | 89/1.816 |
| 4,752,205 A | * | 6/1988 | Moriyama .............. | A23L 7/109 |
| | | | | 425/465 |
| 6,312,749 B1 | * | 11/2001 | Annicchiarico ......... | A21C 3/04 |
| | | | | 425/465 |

FOREIGN PATENT DOCUMENTS

| GB | 1259285 | * | 6/1968 |
| JP | S61-291118 | * | 12/1986 |

* cited by examiner

BUILDING DRAINAGE STACK, FORMING MOULD THEREOF AND FORMING METHOD THEREOF

RELATED APPLICATIONS

This application is a Non-provisional Application under 35 USC 111(a), which claims Chinese Patent Application Serial No. 202010620864.9, filed Jul. 1, 2020, the disclosure of all of which are hereby incorporated by reference in their entirety.

TECHNICAL FIELD

The invention relates to the technical field of civil engineering, in particular to a building drainage stack, a forming mould thereof and a forming method thereof.

BACKGROUND OF THE INVENTION

As frequently-used pipes for building drainage, plastic pipes with smooth inner walls have low frictional resistance, and easily cause water plug flows in case of relatively high water velocity and relatively high flow when used for a building drainage stack, wherein, when the building drainage stack is used for gravity drainage, the water plug flows are mass plug water flows falling down in pipes, which are formed by central water masses falling down in the pipes if the flow quantity is too high, the thickness of water films attached to pipes walls is too high or water flows are influenced by structures. In the water flow status, water flows are less influenced by pipe wall frictional resistance, descend quickly, and form accelerative flows under the gravitational action, thereby giving rise to violent pressure fluctuation and large flow noise which can easily cause damage to water seals of floor drains and stink phenomena in toilets. The improvement on the drainage capacity of the plastic pipes is limited by disadvantages of relatively high pressure fluctuation in the pipes and stink phenomena in the toilets.

SUMMARY OF THE INVENTION

In view of the above, the invention provides a building drainage stack, a forming mould thereof and a forming method thereof. The pressure fluctuation in the drainage stack during drainage is reduced and the falling water velocity is lowered by arranging a helical inner rib on an inner wall of the building drainage stack, and at the same time, a helical blade is provided with three rounded corners to avoid stress concentration and prolong service life. In addition, the structure is simple and the cost is low according to the forming mould and the forming method. Therefore, the invention is relatively more practical.

In order to achieve the above-mentioned first purpose, a technical proposal of the building drainage stack provided by the invention is as follows:

the building drainage stack provided by the invention comprises a stack body (1) and at least one helical blade (2), the helical blade (2) tends helically as a whole in the axial direction of an inner wall of the stack body (1), the helical blade (2) is fixedly connected with the inner wall of the stack body (1) through a bottom side thereof, the inner side of the radial cross section of the helical blade (2) is presented as a first normal distribution curve, the abscissa axis of the first normal distribution curve is on a chord of the inner wall of the stack body (1), and the distance from the chord to the center of the stack body (1) is greater than the half of the inner diameter of the stack body (1) but less than the inner diameter of the stack body (1).

The building drainage stack provided by the invention can be further realized by adopting technical measures as follows.

Preferably, the function expression of the first normal distribution curve is $$f(x) = \int_{-a}^{+a} \frac{1}{\sigma\sqrt{2\pi}} e^{-\frac{1}{2}\left(\frac{x-\mu}{\sigma}\right)^2},$$

wherein a is the distance from an intersection point, where the first normal distribution curve obtained from the function expression and a circle of the inner wall of the stack body (1) intersect, to a symmetry axis of the first normal distribution curve, the unit is mm, $\mu$ is the midpoint of a chord between the intersection points of the first normal distribution curve obtained from the function expression and the circle of the inner wall of the stack body (1), and $\sigma$ ranges from 0.02 mm to 2 mm Preferably, the normal distribution curve at least comprises three curves, wherein the transition between the left bottom edge of the helical blade (2) and the inner wall of the stack body (1) is a first curve (4), and the transition between the right bottom edge of the helical blade (2) and the inner wall of the stack body (1) is a second curve (3); the vertex of the inner side of the helical blade (2) is a third curve (5).

In order to achieve the above-mentioned second purpose, a technical proposal of a forming mould of the building drainage stack provided by the invention is as follows:

the forming mould of the building drainage stack provided by the invention comprises a stack inner wall forming mould (A) and a stack outer wall forming mould (B), the stack inner wall forming mould (A) is used for forming an inner wall of the building drainage stack by extrusion moulding or cutting;

the stack outer wall forming mould (B) is used for forming an outer wall of the building drainage stack by extrusion moulding or cutting.

The forming mould of the building drainage stack provided by the invention can be further realized by adopting technical measures as follows.

Preferably, the stack inner wall forming mould (A) comprises an axle sleeve (8), a plurality of first support spokes (7) and an inner wall moulding template body (6), one end of each of the plurality of first support spokes (7) is fixedly connected with an outer wall of the axle sleeve (8), and the inner wall moulding template body (6) is fixedly connected with the other ends of the plurality of first support spokes (7), so that the inner wall moulding template body (6) is round on the whole;

the inner wall moulding template body (6) is provided with at least one inner bulge (11) presented as a second normal distribution curve, the abscissa axis of the second normal distribution curve is on a chord of the inner wall of the inner wall moulding template body (6), and the distance from the chord to the center of the inner wall moulding template body (6) is greater than the half of the inner diameter of the inner wall moulding template body (6) but less than the inner diameter of the inner wall moulding template body (6), wherein the first normal distribution curve and the second normal distribution curve are the same in shape;

The axle sleeve (8) is used for being fixedly connected with an output shaft of a rotating motor.

Preferably, in the plurality of the first support spokes (7), central angles between every two adjacent first support spokes (7) are the same.

Preferably, the stack outer wall forming mould (B) comprises an outer wall moulding template (14), a plurality of second support spokes (15) and a round fixture (13), one end of each of the plurality of second support spokes (15) is radially and fixedly connected with an outer wall of the outer wall moulding template (14), and the other ends of the plurality of second support spokes (15) are radially and fixedly connected with an inner wall of the round fixture (13).

Preferably, in the plurality of the second support spokes (15), central angles between every two second support spokes (15) are the same.

Preferably, the function expression of the second normal distribution curve is $$f(x) = \int_{-a}^{+a} \frac{1}{\sigma\sqrt{2\pi}} e^{-\frac{1}{2}(\frac{x-\mu}{\sigma})^2},$$

wherein a is the distance from an intersection point, where the second normal distribution curve obtained from the function expression and a circle of the inner wall moulding template body (6) intersect, to a symmetry axis of the second normal distribution curve, the unit is mm, μ is the midpoint of a chord between the intersection points of the second normal distribution curve obtained from the function expression and the circle of the inner wall moulding template body (6), and σ ranges from 0.02 mm to 2 mm.

In order to achieve the above-mentioned third purpose, a technical proposal of a forming method of the building drainage stack provided by the invention is as follows:

the forming method of the building drainage stack provided by the invention comprises the following steps:

firstly, using the stack outer wall forming mould (B) provided by the invention to perform first cutting or extrusion moulding on a to-be-formed material, so as to obtain a cylinder with the diameter equal to the outer diameter of the stack body (1);

fixing the cylinder;

punching an axial center of the cylinder to form a through hole, and obtaining an intermediate product with the diameter larger than or equal to the outer diameter of the axle sleeve (8) of the inner wall forming mould provided by the invention and less than twice the distance from the vertex of the inner bulge (11) to the axis of the cylinder;

configuring the output shaft of the rotating motor to penetrating into the through hole from one end of the through hole to the other end of the through hole;

fixedly connecting the inner wall forming mould (A) with the output shaft of the rotating motor via the axle sleeve (8);

fixing the rotating motor on a trolley in linear motion in the axial direction of the building stack;

starting the rotating motor and starting the trolley simultaneously, enabling the inner wall forming mould (A) to move in the axial direction of the stack body (1), and enabling the inner wall forming mould (A) to rotationally move along with the output shaft of the rotating motor, so as to subject the intermediate product to second cutting or extrusion moulding and obtain the building drainage stack.

According to the building drainage stack provided by the invention, the pressure fluctuation in the building drainage stack is reduced and the falling water velocity is lowered by arranging the helical inner rib, with the radial cross section presented as the first normal distribution curve, on the inner wall of the building drainage stack, wherein the transition between the left bottom edge of the helical blade (2) and the inner wall of the stack body (1) is the first curve (4), and the transition between the right bottom edge of the helical blade (2) and the inner wall of the stack body (1) is the second curve (3), therefore, stress concentration at the connection of the helical blade (2) and the inner wall of the stack body (1) can be avoided, the possibility of breakage between the helical blade (2) and the inner wall of the stack body (1) is further reduced, and the service life is further prolonged. Besides, the vertex of the inner side of the helical blade (2) is the third curve (5), i.e. sharpness on the inner side of the helical blade (2) is completely eliminated, a strong leaning problem of water flows which have relatively large leaving curvature and move to the center of the stack can be avoided, and a water flow wall-attached effect is improved to the utmost extent; in addition, the abrasion loss can be reduced when a water flow impact happens, and the noise is reduced when water flows.

The forming mould of the building drainage stack provided by the invention is simple in structure, easy to realize and low in processing cost, and a needed workshop is small in area and low in investment.

The forming method of the building drainage stack provided by the invention is simple in processing and low in cost.

BRIEF DESCRIPTION OF THE DRAWINGS

By reading the detailed description of the preferred embodiments below, various other advantages and benefits will become clear to those of ordinary skill in the art. The drawings are for the purpose of showing preferred embodiments only and are not considered to be a limitation of the invention. In addition, the same reference symbols are used to represent the same components throughout the drawings. In the figure.

DETAILED DESCRIPTION OF EMBODIMENTS

In view of the above, the invention provides a building drainage stack, a forming mould thereof and a forming method thereof. A helical inner rib, with the radial cross section presented as a normal distribution curve, is arranged on an inner wall of the building drainage stack, so that sharpness at a top and sharpness at the connection between the top and the inner wall of the building drainage stack are completely eliminated, the pressure fluctuation in the drainage stack during drainage is reduced, the falling water velocity is lowered, and at the same time, a helical blade is provided with three rounded corners to avoid stress concentration and prolong service life. In addition, the structure is simple and the cost is low according to the forming mould and the forming method. Therefore, the invention is relatively practical.

Embodiment 1: An Embodiment of a Building Drainage Stack

Figure 1:
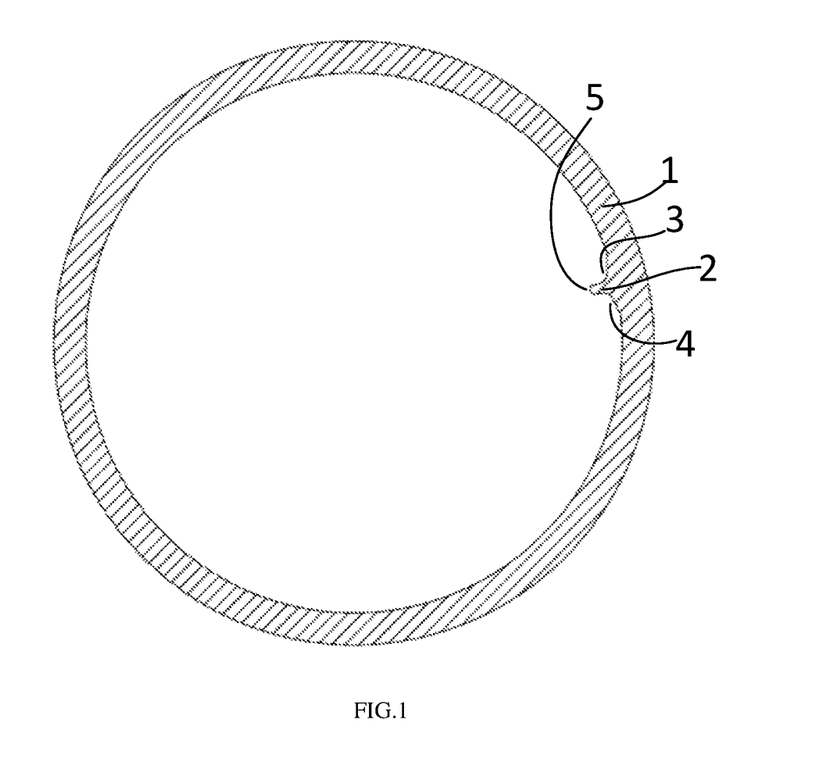
FIG. 1 is a radial cross section diagram of a building drainage stack provided by an embodiment of the invention.

With reference to FIG. 1, the embodiment of the invention provides a building drainage stack comprising a stack body (1) and at least one helical blade (2). The helical blade (2) tends helically as a whole in the axial direction of an inner wall of the stack body (1), and the helical blade (2) is fixedly connected with the inner wall of the stack body (1) through a bottom side thereof. The inner side of the radial cross section of the helical blade (2) is presented as a first normal distribution curve, the abscissa axis of the first normal distribution curve is on a chord of the inner wall of the stack body (1), and the distance from the chord to the center of the stack body (1) is greater than the half of the inner diameter of the stack body (1) but less than the inner diameter of the stack body (1). In the embodiment, the normal distribution curve at least comprises three curves. In the embodiment, curves are non-straight lines, and non-straight lines comprise arcs, polygonal line and lines which can change tendencies, wherein the transition between the left bottom edge of the helical blade (2) and the inner wall of the stack body (1) is a first curve (4), and the transition between the right bottom edge of the helical blade (2) and the inner wall of the stack body (1) is a second curve (3); the vertex of the inner side of the helical blade (2) is a third curve (5). In this case, the transition between the left bottom edge of the helical blade (2) and the inner wall of the stack body (1) is the first curve (4), and the transition between the right bottom edge of the helical blade (2) and the inner wall of the stack body (1) is the second curve (3), therefore, the building drainage stack can avoid stress concentration at the connection of the helical blade (2) and the inner wall of the stack body (1), the possibility of breakage between the helical blade (2) and the inner wall of the stack body (1) is further reduced, and the service life is further prolonged. Besides, the vertex of the inner side of the helical blade (2) is the third curve (5), i.e. the inner side of the helical blade (2) can reduce abrasion loss when suffering from water flow impacts, and the noise is reduced when water flows, wherein the third curve (5) is at the vertex of the normal distribution curve, and the first curve (4) and the second curve (3) are formed at two intersection points of the normal distribution curve and the inner wall of the stack body (1).

The embodiment 1 of the invention provides the building drainage stack which reduces the pressure fluctuation in the drainage stack during drainage and lowers the falling water velocity by arranging the helical inner rib on the inner wall of the building drainage stack, wherein the transition between the left bottom edge of the helical blade (2) and the inner wall of the stack body (1) is the first curve (4), and the transition between the right bottom edge of the helical blade (2) and the inner wall of the stack body (1) is the second curve (3), therefore, the building drainage stack can avoid stress concentration at the connection of the helical blade (2) and the inner wall of the stack body (1), the possibility of breakage between the helical blade (2) and the inner wall of the stack body (1) is further reduced, and the service life is further prolonged. Besides, the vertex of the inner side of the helical blade (2) is the third curve (5), i.e. the vertex on the inner side of the helical blade (2) can reduce abrasion loss when suffering from water flow impacts, and the noise is reduced when water flows. Besides, sharpness is completely eliminated by the first normal distribution curve, a strong leaning problem of water flows which have relatively large leaving curvature and move to the center of the stack can be avoided, the water flow wall-attached effect is improved to the utmost extent. In the embodiment, the first curve (4) and the second curve (3) are congruent. In this case, water flows through two sides of the helical blade (2) in force balance, thereby avoiding the helical blade (2) from being beaten down to a smaller force side due to long-term force unbalance, and avoiding the service life of the building drainage stack provided by the embodiment 1 of the invention from being shortened.

Figure 5:
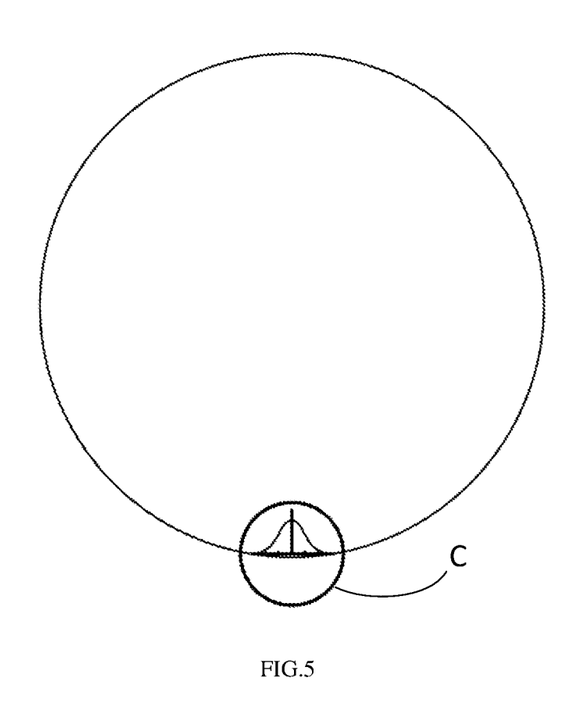
FIG. 5 is a radial cross section diagram of an inner wall of a building drainage stack provided by an embodiment of the invention.
Figure 6:
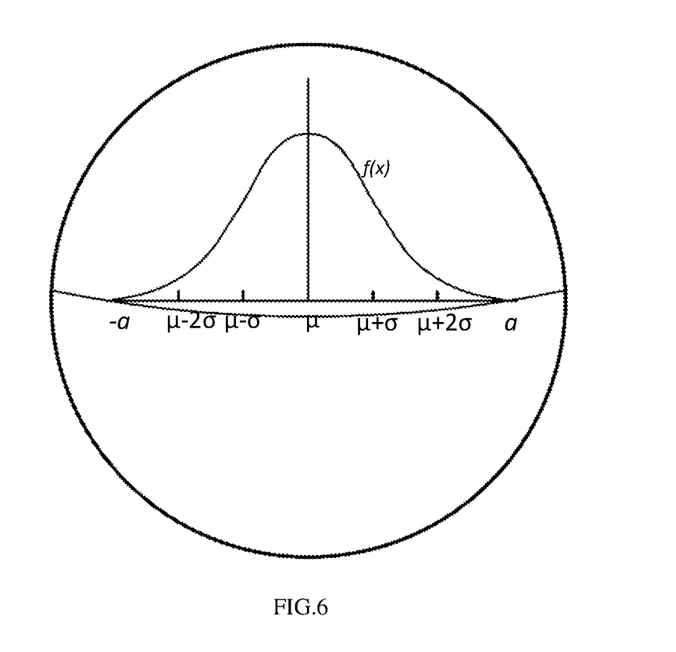
FIG. 6 is a partial enlarged drawing of part C in FIG. 5.

With reference to FIG. 5 and FIG. 6, in the building drainage stack provided by the embodiment 1 of the invention, the sharp of the curve on the inner side of the cross section of the helical blade (2) is presented as the first normal distribution curve, the function expression of the first normal distribution curve is $$f(x) = \int_{-a}^{+a} \frac{1}{\sigma\sqrt{2\pi}} e^{-\frac{1}{2}\left(\frac{x-\mu}{\sigma}\right)^2},$$

wherein a is the distance from an intersection point, where the first normal distribution curve obtained from the function expression and a circle of the inner wall of the stack body (1) intersect, to a symmetry axis of the first normal distribution curve, the unit is mm, $\mu$ is the midpoint of a chord between the intersection points of the first normal distribution curve obtained from the function expression and the circle of the inner wall of the stack body (1), and $\sigma$ ranges from 0.02 mm to 2 mm. In this case, according to the embodiment 1 of the invention, the sharp of the curve on the inner side of the cross section of the helical blade (2) is expressed by applying the function expression, the round sharp of the building drainage stack body (1) provided by the embodiment 1 of the invention also can be expressed by applying a function expression, i.e., $x^2+y^2=R^2$, thus the sharp of each radial cross section of the building drainage stack provided by the embodiment 1 of the invention can be expressed by applying analytic geometry, thereafter, the point position of $\mu$ gradually changes in the axial direction of the building drainage stack body (1) provided by the embodiment 1 of the invention, the sharp of the building drainage stack body (1) provided by the embodiment 1 of the invention can be obtained via mathematical modeling through a computer program, and a foundation can be laid for applying the 3D printing technology to the building drainage stack provided by the embodiment 1 of the invention. In the embodiment, when $x=\mu$, the distance from the highest point of the radial cross section to the lowest point of the radial cross section is obtained and is larger than 0 but less than $$\frac{1}{\sigma\sqrt{2\pi}} \text{ mm},$$

wherein, when σ=0.02 mm, the distance is about 20 mm, and when σ=2 mm, the distance is about 0.2 mm.

Embodiment 2: An Embodiment of a Forming Mould of a Building Drainage Stack

Figure 2:
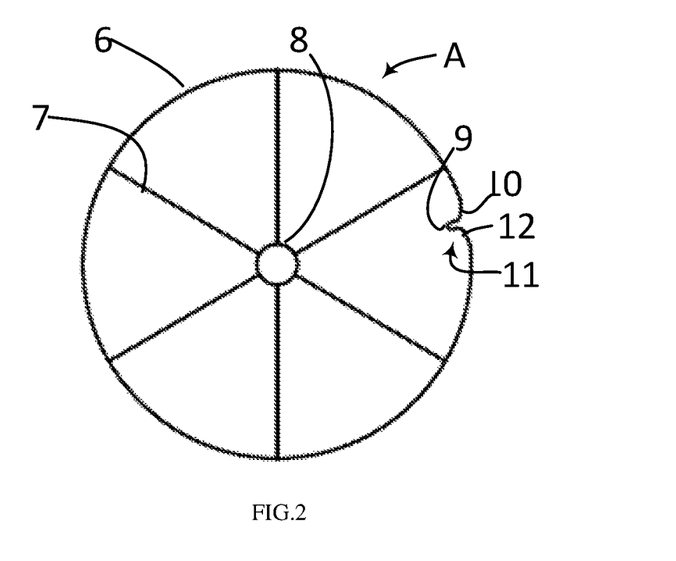
FIG. 2 is a structural diagram of an inner wall forming mould of a building drainage stack provided by an embodiment of the invention.
Figure 3:
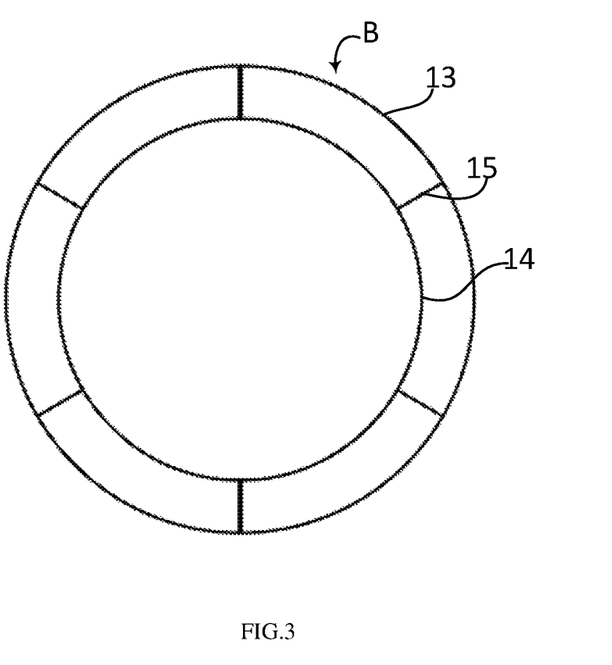
FIG. 3 is a structural diagram of an outer wall forming mould of a building drainage stack provided by an embodiment of the invention.
Figure 4:
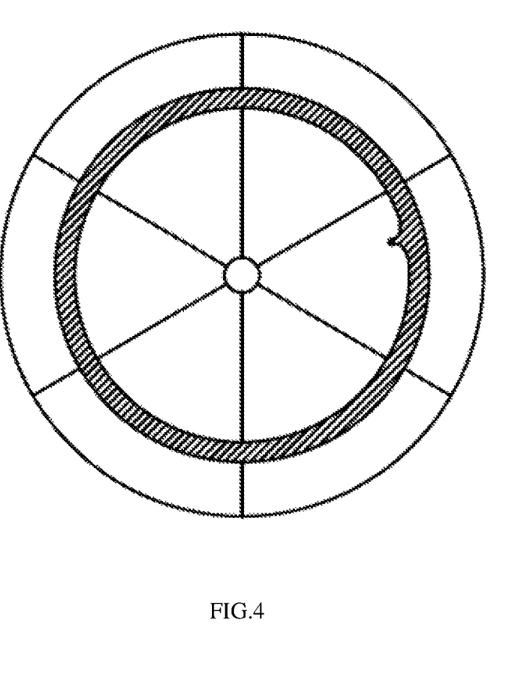
FIG. 4 is a diagram of cooperative relation between an inner wall forming mould and an outer wall forming mould provided by an embodiment of the invention, and a building drainage stack provided by the invention.

With reference to FIG. 2-FIG. 4, a forming mould of a building drainage stack provided by the embodiment 2 of the invention comprises a stack inner wall forming mould (A) and a stack outer wall forming mould (B). The stack inner wall forming mould (A) is used for forming an inner wall of the building drainage stack by extrusion moulding or cutting; the stack outer wall forming mould (B) is used for forming an outer wall of the building drainage stack by extrusion moulding or cutting.

In this case, the forming mould of the building drainage stack provided by the embodiment 2 of the invention has the advantages of convenience for moulding, simple materials and low cost.

The stack inner wall forming mould (A) comprises an axle sleeve (8), a plurality of first support spokes (7) and an inner wall moulding template body (6). one end of each of the plurality of first support spokes (7) is fixedly connected with an outer wall of the axle sleeve (8), and the inner wall moulding template body (6) is fixedly connected with the other ends of the plurality of first support spokes (7), so that the inner wall moulding template body (6) is round on the whole. The inner wall moulding template body (6) is provided with at least one inner bulge (11) presented as a second normal distribution curve, the abscissa axis of the second normal distribution curve is on a chord of the inner wall of the inner wall moulding template body (6), and the distance from the chord to the center of the inner wall moulding template body (6) is greater than the half of the inner diameter of the inner wall moulding template body (6) but less than the inner diameter of the inner wall moulding template body (6), wherein the first normal distribution curve and the second normal distribution curve are the same in shape; the axle sleeve (8) is used for being fixedly connected with an output shaft of a rotating motor. In this case, the inner wall moulding template body (6) is limited by the plurality of first support spokes (7), so that the risk of bending deformation of the inner wall moulding template body (6) under radial force can be reduced, and the service life of the inner wall moulding template body (6) is prolonged. In order to avoid a to-be-extrusion-moulded pipe or a to-be-cut pipe from being attached to the inner wall moulding template body (6) during application, lubricating grease can be applied onto an outer wall of the inner wall moulding template body (6) to reduce the frictional resistance between the outer wall of the inner wall moulding template body (6) and the to-be-extrusion-moulded pipe or the to-be-cut pipe. In the embodiment, the lubricating grease is applied to reduce loss caused by attachment on the inner wall of the building drainage stack body (1) obtained by extrusion moulding or cutting, so that the cost is lower.

In the plurality of the first support spokes (7), central angles between every two adjacent first support spokes (7) are the same. In this case, the isotropy of the forming mould of the building drainage stack provided by the embodiment 2 of the invention can be ensured, so that the inner wall moulding template body (6) provided by the embodiment 2 of the invention can be further improved in stability after suffering external extrusion force.

The stack outer wall forming mould (B) comprises an outer wall moulding template (14), a plurality of second support spokes (15) and a round fixture (13). One end of each of the plurality of second support spokes (15) is radially and fixedly connected with an outer wall of the outer wall moulding template (14), and the other ends of the plurality of second support spokes (15) are radially and fixedly connected with an inner wall of the round fixture (13). In this case, the outer wall moulding template (14) is pulled by the plurality of second support spokes (15), so that the outer wall moulding template (14) under external extrusion force can be avoided from bending deformation, and the outer wall moulding template (14) provided by the embodiment 2 of the invention can be further improved in application stability.

In the plurality of the second support spokes (15), central angles between every two first support spokes (15) are the same. In this case, the isotropy of the forming mould of the building drainage stack provided by the embodiment 2 of the invention can be ensured, so that the outer wall moulding template (14) provided by the embodiment 2 of the invention can be further improved in stability after suffering external extrusion force.

An inner bulge (11) is presented as a second normal distribution curve, the function expression of the second normal distribution curve is $$f(x) = \int_{-a}^{+a} \frac{1}{\sigma\sqrt{2\pi}} e^{-\frac{1}{2}(\frac{x-\mu}{\sigma})^2},$$

wherein a is the distance from an intersection point, where the second normal distribution curve obtained from the function expression and a circle of the inner wall moulding template body (6) intersect, to a symmetry axis of the second normal distribution curve, the unit is mm, p, is the midpoint of a chord between the intersection points of the second normal distribution curve obtained from the function expression and the circle of the inner wall moulding template body (6), and 6 ranges from 0.02 mm to 2 mm. In this case, according to the embodiment 1 of the invention, the sharp of the curve on the inner side of the section of the helical blade (2) is expressed by applying the function expression, the round sharp of the building drainage stack body (1) provided by the embodiment of the invention also can be expressed by applying a function expression, i.e., $x^2+y^2=R^2$, thus the sharp of the inner wall moulding template body (6) provided by the embodiment 2 of the invention can be expressed by applying analytic geometry, and the motion track of a machine used for forming the inner bulge (11) on the inner wall moulding template body (6) provided by the embodiment 2 of the invention can be controlled accurately by applying a computer program on the basis, thereby laying a foundation for fully automatic manufacturing of the inner wall moulding template body (6) provided by the embodiment 2 of the invention. In the embodiment, when x=μ, the distance from the highest point of the radial cross section to the lowest point of the radial cross section is obtained and is larger than 0 but less than $$\frac{1}{\sigma\sqrt{2\pi}} \text{ mm,}$$

wherein, when σ=0.02 mm, the distance is about 20 mm, and when σ=2 mm, the distance is about 0.2 mm.

Embodiment 3: An Embodiment of a Forming Method of a Building Drainage Stack

Figure 7:
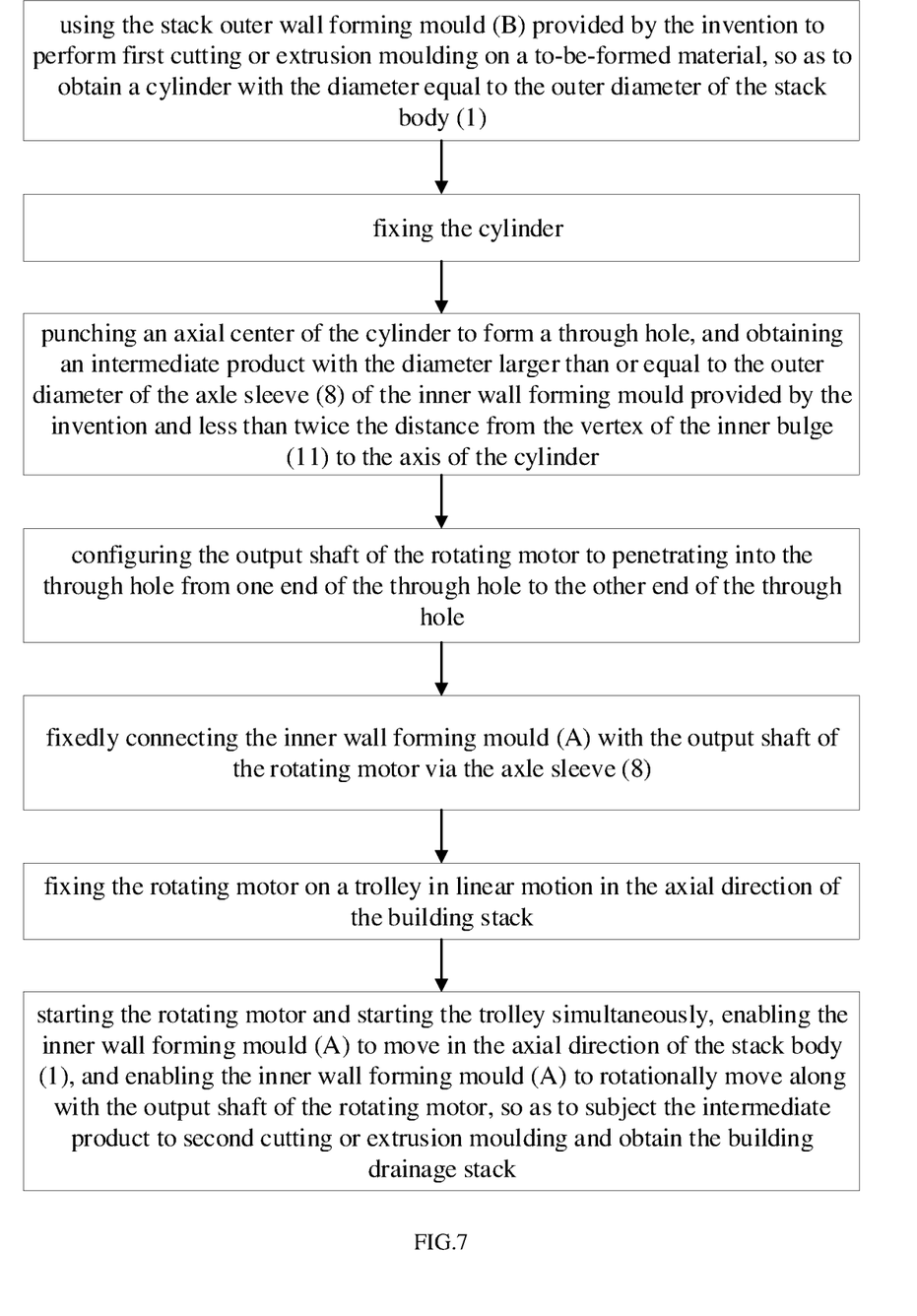
FIG. 7 is a step flowchart of a forming method of a building drainage stack provided by an embodiment of the invention.

The forming method of the building drainage stack provided by the embodiment of the invention comprises the following steps:

S1: firstly, using the outer wall forming mould (B) provided by the embodiment of the invention to perform first cutting or extrusion moulding on a to-be-formed material, so as to obtain a cylinder with the diameter equal to the outer diameter of the stack body (1);

S2: fixing the cylinder;

S3: punching an axial center of the cylinder to form a through hole, and obtaining an intermediate product with the diameter larger than or equal to the outer diameter of the axle sleeve (8) of the inner wall forming mould provided by the embodiment 2 of the invention and less than twice the distance from the vertex of the inner bulge (11) to the axis of the cylinder;

S4: configuring an output shaft of the rotating motor to penetrating into the through hole from one end of the through hole to the other end of the through hole;

S5: fixedly connecting the inner wall forming mould (A) with the output shaft of the rotating motor via the axle sleeve (8);

S6: fixing the rotating motor on a trolley in linear motion in the axial direction of the building stack;

S7: starting the rotating motor and starting the trolley simultaneously, enabling the inner wall forming mould (A) to move in the axial direction of the stack body (1), and enabling the inner wall forming mould (A) to rotationally move along with the output shaft of the rotating motor, so as to subject the intermediate product to second cutting or extrusion moulding and obtain the building drainage stack.

The forming method of the building drainage stack provided by the embodiment of the invention is simple in operation and low in cost, a workshop is small in area, and no additional cost is required.

Although preferred embodiments of the invention have been described, once a person skilled in the art has learned the basic creative concepts, they may make additional changes and modifications to them. Therefore, the appended claims are intended to be interpreted to include preferred embodiments and all changes and modifications falling within the scope of the present invention.

Obviously, those skilled in the art can make various changes and variations to the invention without departing from the spirit and scope of the invention. Thus, if these modifications and variations of the invention fall within the scope of the claims of the invention and the equivalent technology, the invention also intends to include these changes and variations.

The invention claimed is:

1. A molding mold for a building drainage riser, the building drainage riser comprises a building drainage stack with a stack body (1) and at least one helical blade (2), wherein the at least one helical blade (2) extends helically as a whole in an axial direction of an inner wall of the stack body (1), the at least one helical blade (2) is fixedly connected with the inner wall of the stack body (1), and an inner side of a radial cross section of the at least one helical blade (2) has as a first normal distribution curve with an abscissa axis on a first chord of the inner wall of the stack body (1), the molding mold for building the drainage riser comprises:

a stack inner wall forming mold (A) and a stack outer wall forming mold (B);

the stack inner wall forming mold (A) is capable of forming the inner wall of the stack body (1) by extrusion molding or cutting;

the stack outer wall forming mold (B) is capable of forming an outer wall of the stack body (1) by extrusion molding or cutting;

wherein the stack inner wall forming mold (A) comprises an axle sleeve (8), a plurality of first support spokes (7), and an inner wall molding template body (6), wherein:

the inner wall molding template body (6) is provided with at least one inner bulge (11) having a second normal distribution curve with an abscissa axis on a second chord of an inner wall of the inner wall molding template body (6);

the at least one inner bulge extends towards a center of the inner wall molding template body (6);

a shape of the first normal distribution curve and a shape the second normal distribution curve are substantially the same;

one end of each of the plurality of first support spokes (7) is fixedly connected with an outer wall of the axle sleeve (8);

the inner wall of the inner wall molding template body (6) is fixedly connected with other ends of the plurality of first support spokes (7) so that the inner wall molding template body (6) is substantially circular where the at least one inner bulge is not provided; and the axle sleeve (8) is capable of being fixedly connected with an output shaft of a rotating motor.

2. The molding mold for building the drainage riser according to claim 1, wherein central angles between every two adjacent first support spokes (7) are the same.

3. The molding mold for the building drainage riser according to claim 1, wherein the stack outer wall forming mold (B) comprises an outer wall molding template (14), a plurality of second support spokes (15) and a round fixture (13); and one end of each of the plurality of second support spokes (15) is radially and fixedly connected with an outer wall of the outer wall molding template (14), and other ends of the plurality of second support spokes (15) are radially and fixedly connected with an inner wall of the round fixture (13).

4. The molding mold for the building drainage riser according to claim 3, wherein central angles between every two second support spokes (15) are the same.

5. The molding mold for the building drainage riser according to claim 1, wherein a function expression of the second normal distribution is:

$$f(x) = \int_{-a}^{+a} \frac{1}{\sigma\sqrt{2\pi}} e^{-\frac{1}{2}\left(\frac{x-\mu}{\sigma}\right)^2};$$

and
wherein:

$\mu$ is a midpoint of the second chord corresponding to a symmetrical axis of the second normal distribution curve;

$\alpha$ is a distance, along the second chord, between $\mu$ and a point where the second normal distribution curve intersects both the second chord and a circular portion of the inner wall molding template body (6); and $\sigma$ ranges from 0.02 mm to 2 mm.

* * * * *